Figure 1:
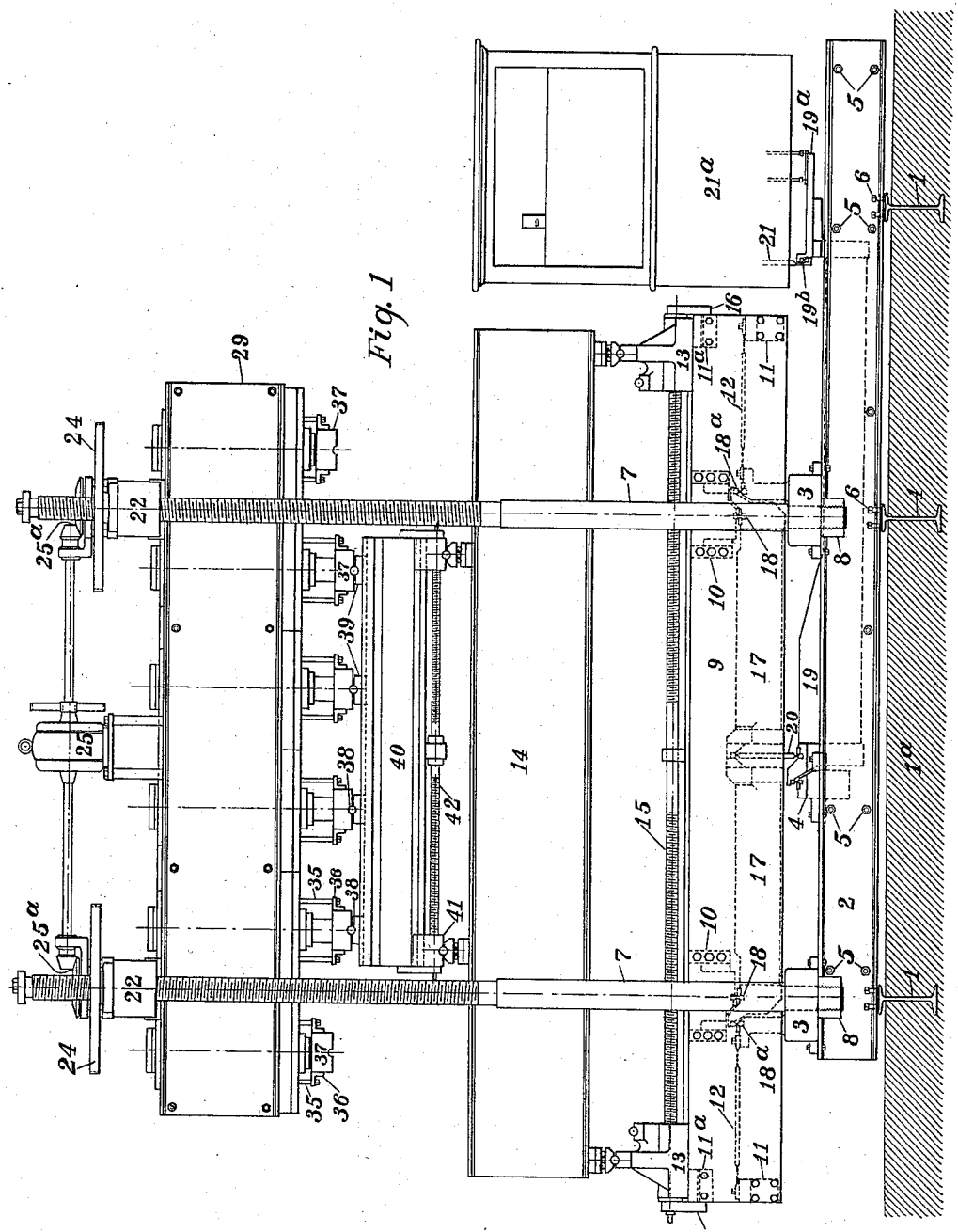

A. H. EMERY.
TRANSVERSE TESTING MACHINE.
APPLICATION FILED APR. 29, 1914.

1,147,153.

Patented July 20, 1915.
7 SHEETS—SHEET 2.

WITNESSES

INVENTOR
Albert Hamilton Emery
By Knight Bro.
Attorneys.

A. H. EMERY.
TRANSVERSE TESTING MACHINE.
APPLICATION FILED APR. 29, 1914.
1,147,153.
Patented July 20, 1915.
7 SHEETS—SHEET 3.
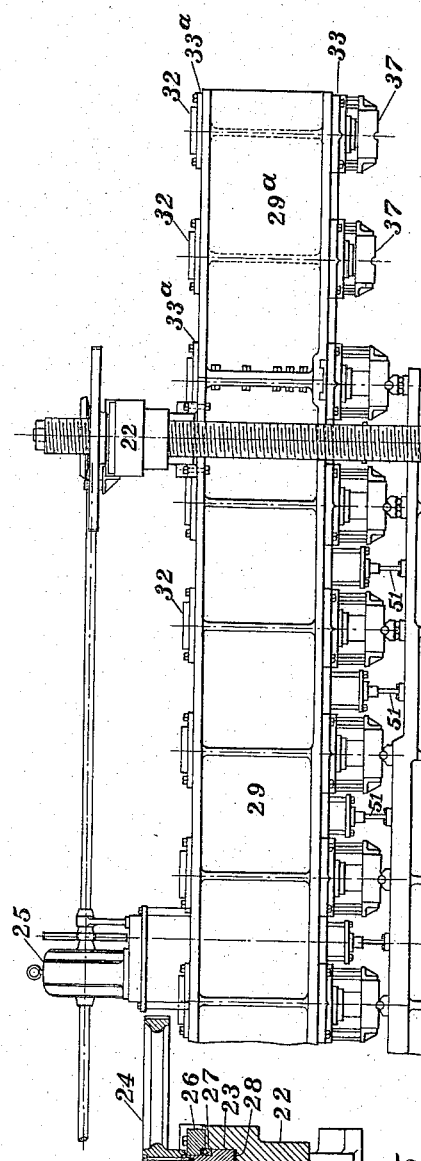
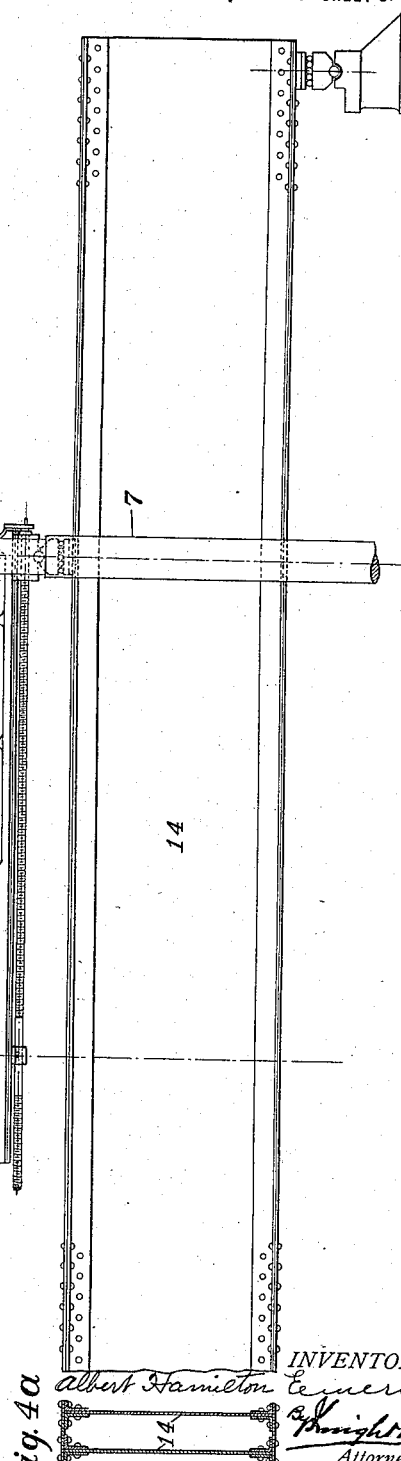
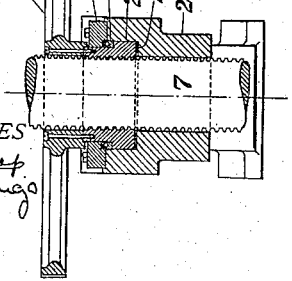
WITNESSES
INVENTOR
Albert Hamilton Emery
Attorneys.

A. H. EMERY.
TRANSVERSE TESTING MACHINE.
APPLICATION FILED APR. 29, 1914.

1,147,153.

Patented July 20, 1915.
7 SHEETS—SHEET 4.

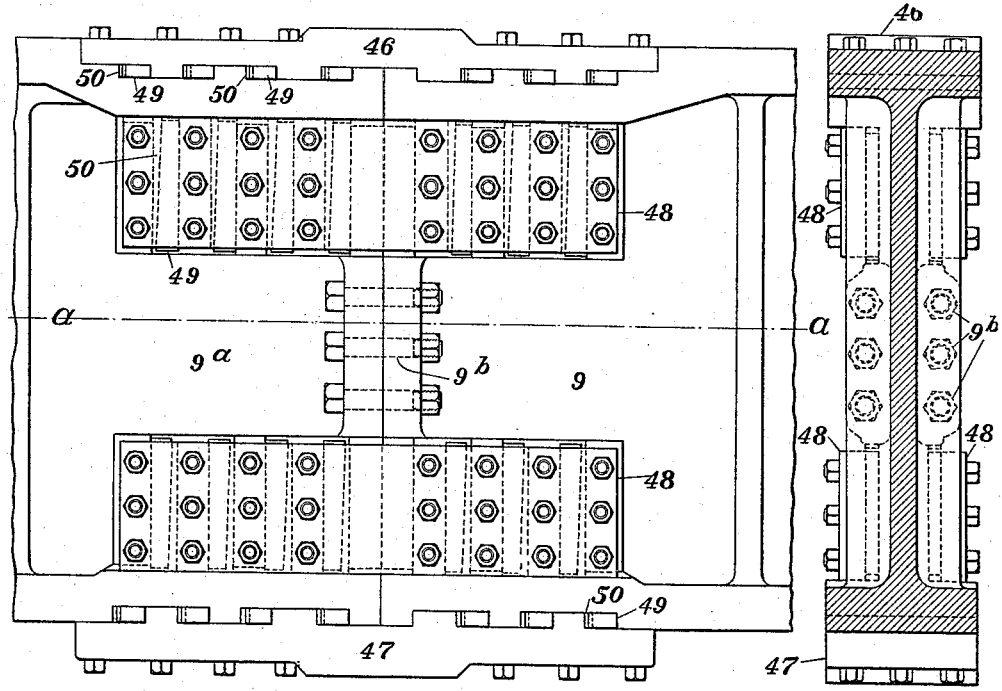

A. H. EMERY.
TRANSVERSE TESTING MACHINE.
APPLICATION FILED APR. 29, 1914.

1,147,153.

Patented July 20, 1915.
7 SHEETS—SHEET 6.

UNITED STATES PATENT OFFICE.

ALBERT HAMILTON EMERY, OF STAMFORD, CONNECTICUT.

TRANSVERSE TESTING-MACHINE.

1,147,153. Specification of Letters Patent. Patented July 20, 1915.

Application filed April 29, 1914. Serial No. 835,196.

*To all whom it may concern:*

Be it known that I, ALBERT HAMILTON EMERY, a citizen of the United States, residing at Stamford, in the county of Fairfield and State of Connecticut, have invented certain new and useful Improvements in Transverse Testing-Machines, of which the following is a specification.

My invention relates to a testing machine having a plurality of loading presses, as well as to certain novel details of construction of such a machine, all as pointed out in the subjoined claims, and substantially as found in the illustrative machines disclosed in the accompanying drawings and described in the following specification. The construction and arrangement of said illustrative machines is essentially as follows. A lower bed carries two pair of vertical columns securely fastened thereto and the upper portions of these columns are threaded and each pair carries a heavy cross head through gear driven nuts, these two cross heads in turn carrying the press supporting beams of the machine. These beams carry a plurality of hydraulic presses with their cylinders fastened rigidly thereto and these presses produce the load for stressing the specimen being tested. The lower or foundation bed also carries the fixed fulcrums of a pair of levers, which in turn carry the main platform of the machine and the specimen being tested, which rests upon this main platform through suitable supports. All the load put upon the specimen by the presses referred to is transmitted by the specimen to these supports and through it to the first pair of levers. The first pair of levers transmit a portion of the load to the second lever which also has its fixed fulcrum carried by the foundation bed of the machine. This lever extends longitudinally of the machine beyond one end of the main platform where it transmits a portion of the load to be weighed to that part of the scale contained in the scale case, where the load put upon the specimen is shown. The loading presses may act individually or collectively upon the specimen, giving a large variety of loadings. By admitting the same hydraulic pressure to each of the presses the condition of a uniformly distributed load can be very nearly approximated, or by the use of a load-concentrating beam, the load from a large number of presses can be concentrated on the specimen at one or two points as desired.

Figure 2:
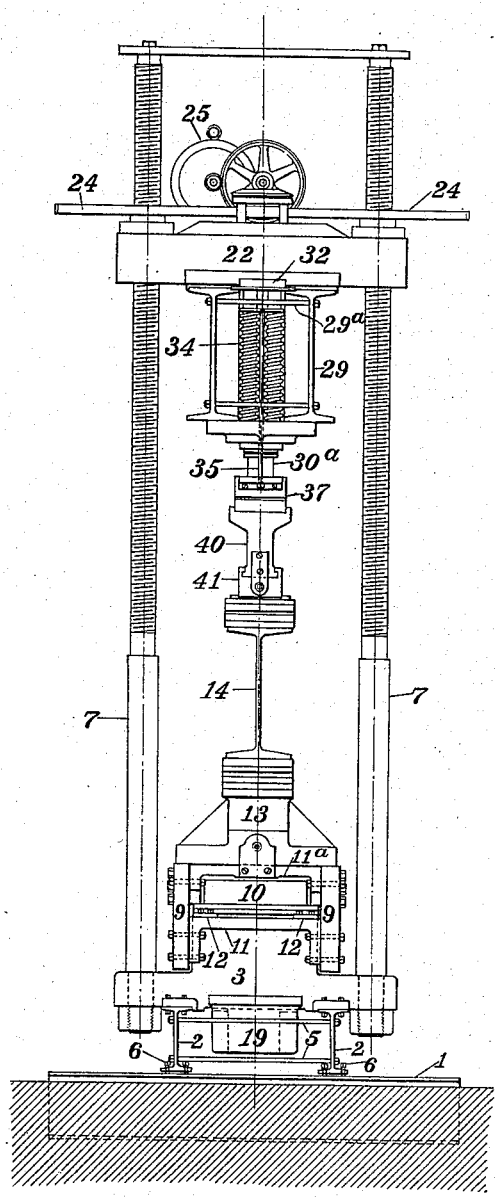
Figure 3:
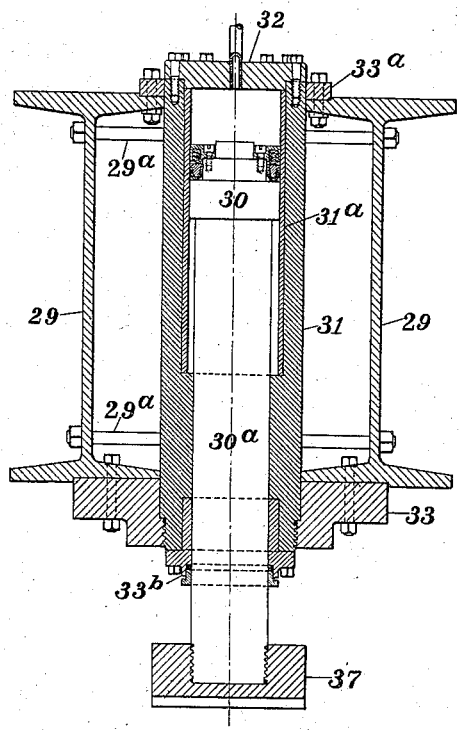
Figure 6:
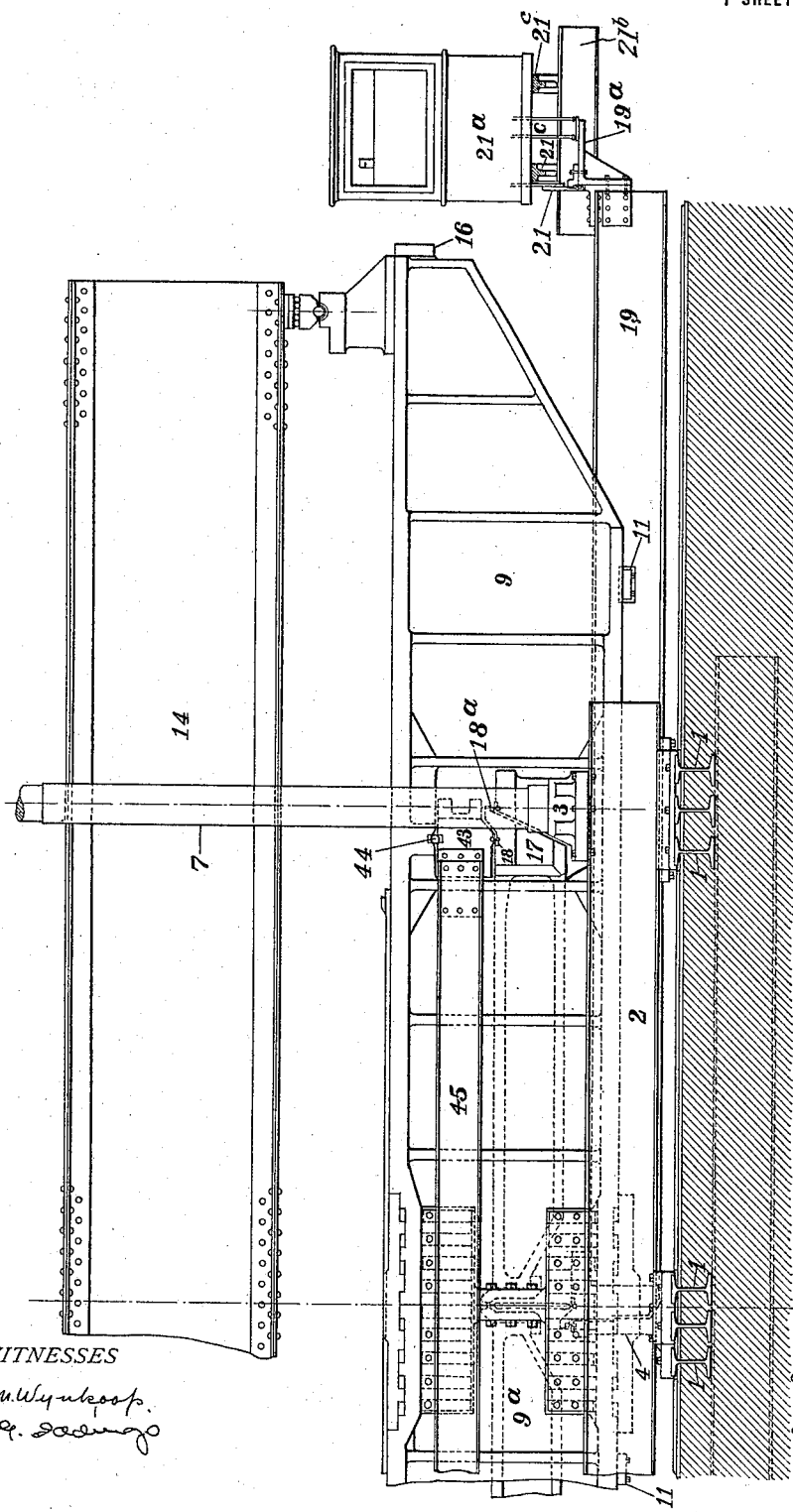
Figure 12:
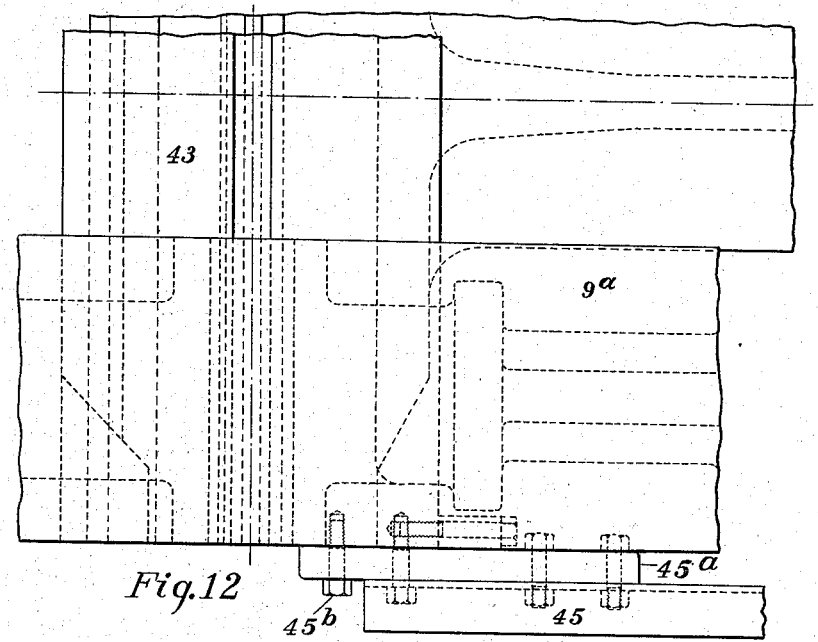
Figure 11:
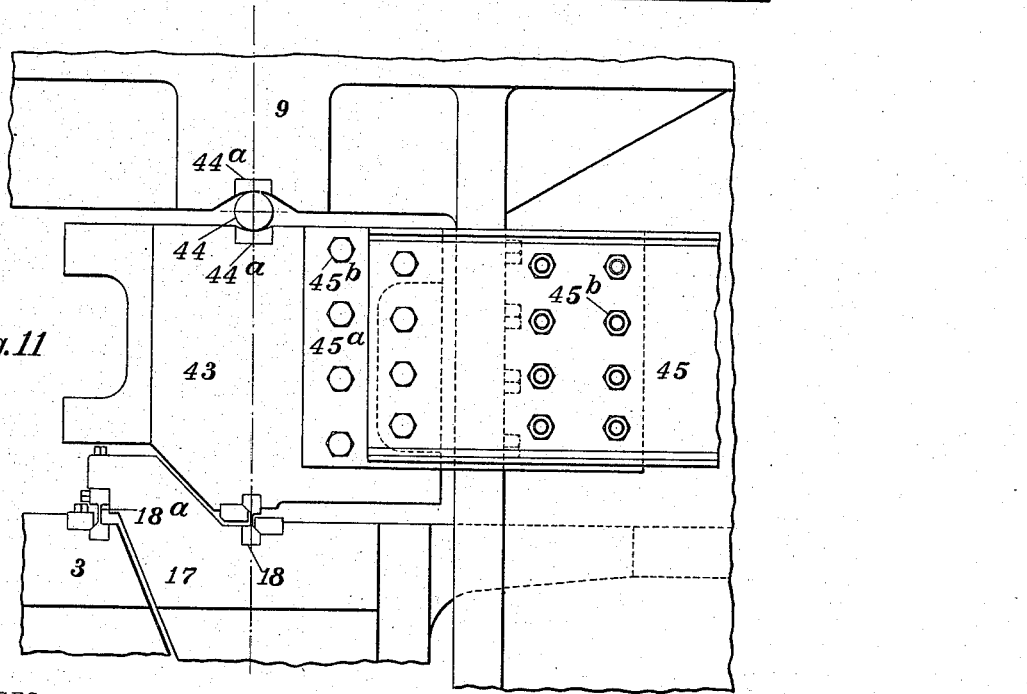
Figure 14:
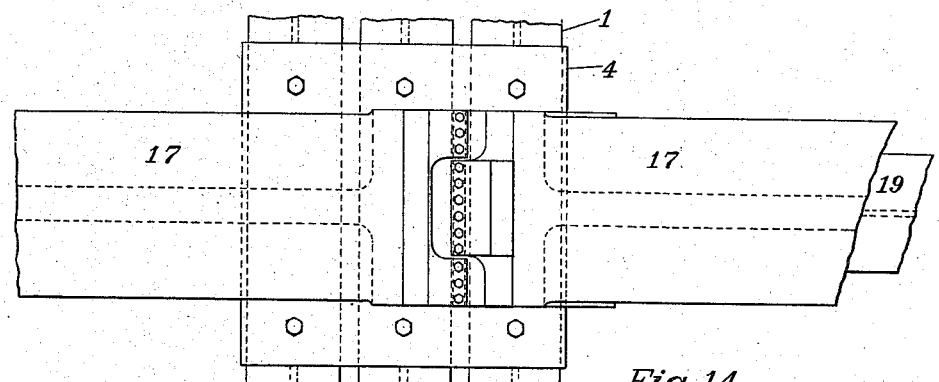
Figure 13:
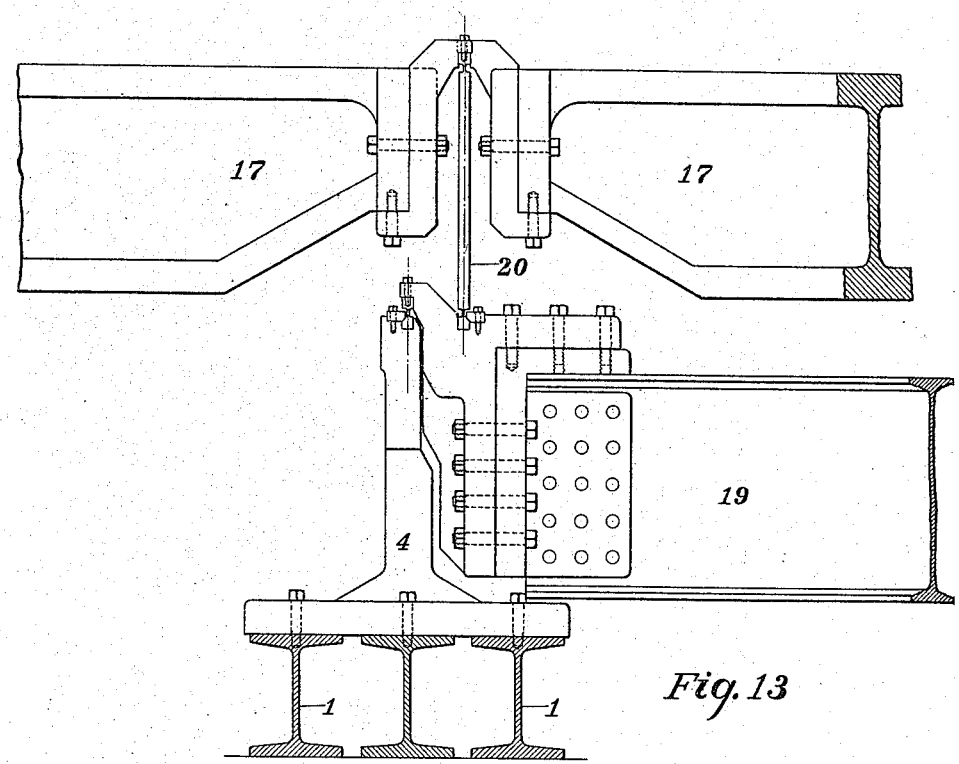

In the aforesaid drawings:—Figures 1, 2 and 3 show a machine with six presses, while the remaining figures show portions of a larger machine having fourteen presses; Fig. 1 being a side elevation of a six-press machine; Fig. 2 an end view as seen from the right of Fig. 1, but with the scale case and contents removed, and Fig. 3 is a vertical section of one of the six similarly constructed hydraulic presses and the means of fastening the same to the two-part beam which carries them. Fig. 4 shows a side elevation of a portion of the larger testing machine of the kind shown in Fig. 1, but with fourteen presses instead of six, the figure showing the upper portion of one of the four screw-loading columns; a little over half of the upper beam, with eight of the fourteen loading presses; little over half of the load-concentrating beam; and a portion of the specimen being tested. Fig. 4ª shows a section of the specimen being tested. Fig. 5 is a detail view of one of the upper cross heads drawn in transverse section, in the plane of the center line of one of the columns, showing the form of the gear driven nuts, of which there are four, and which carry the upper cross head beams and presses, up and down, and which transmit the load from the presses to the screw columns. Fig. 6 shows in side elevation, the portion of the specimen and the lower portion of the columns shown in Fig. 4, together with the lower portion of the machine, including part of the platform, the first and second levers, and the scale for weighing the specimen and the load put upon the specimen. Fig. 7 shows in side elevation, the joint between portions of the main platform, which, in the present machine, because of the largeness of the members, is made in four principal pieces connected very rigidly in pairs to form two main beams. Fig. 8 shows an end view of the joint shown in Fig. 7 with one of the four platform beams in section. Fig. 9 shows a plan view of the joint shown in Fig. 7 with the right hand part of the cover plate removed. Fig. 10 shows a horizontal section of the joint taken on the line *a*—*a* Fig. 7. Fig. 11 is an enlarged detail view, showing a part of one of the first levers and its fixed and loading fulcrums and illustrating the method of transmitting the load from the main platform to the first levers. Fig. 12 shows in plan view, a part of the construction shown in Fig. 11. Fig. 13 is an enlarged detail view of a part of Fig. 6, showing the inner ends of the first levers and the short end of the second lever and the long compression fulcrum connecting them. Fig. 14 is a plan view of the same.

My invention is more fully described in the following specification in which the same numerals in the various figures refer to the same or similar parts.

In Figs. 1 and 2, 1 represents three cross beams set in a concrete foundation $1^a$. 2 are longitudinal I-beams to which are bolted the three cross beams 3 and 4. The beams 2 are also fastened together with cross stay bolts 5. These beams 2 with the cross beams 3 and 4 form the foundation bed of the machine, and this bed is carried on the cross beams 1 by the leveling screws 6. Each of the cross beams 3 carries at each end a vertical column 7 which has its upper portion threaded. These columns are secured by the circular nuts 8 to the cross beams 3. The load-receiving platform of this testing machine is here shown as constructed with two deep side beams 9 firmly connected by two main cross beams 10 and four light cross beams 11 and $11^a$, and it is held against longitudinal movement by the four stay plates 12. These stay plates are made thin near each end so that while they very firmly resist any longitudinal motion of the platform they offer very slight resistance to its vertical movement.

The upper faces of the side beams 9 form ways on which are carried two supports 13 which support the specimen 14 through suitable pins, plates and rollers as shown, the specimen here shown under test being an I-beam. The supports 13 can be adjusted in their positions on the platform by means of the right and left hand threads on shaft 15 which runs in nuts fixed in supports 13 and is held against longitudinal motion by the plates 16.

The weight of the specimen of the supports and of the main platform together with all the load applied to the specimen during test, is carried by the cross load beams 10 onto the first levers 17, through the fulcrums 18. The form of the fulcrums used is fully described and claimed in Patent No. 1,041,609, issued to me under date of October 15, 1912. Each of the levers 17 is supported by a similar fulcrum $18^a$ in one of the cross beams 3 and they carry a portion of their load to the second lever 19 through the compression loading plate-fulcrum 20, which is reduced in thickness near each fixed end. This second lever 19 is carried on a fulcrum fixed to the cross beams 4 (Figs. 1 and 13) and extends to the right under the cross beam 3 and between the foundation beams 2, extending beyond the end of the main platform. An extension bar $19^a$ is securely bolted to the end of the lever and carries the fulcrum $19^b$. The yoke rod 21 connects the lever 19 to a scale beam in the case where the downward pull on the rod 21 is balanced. This pull is exactly proportionate to the vertical load on the fulcrum 18 and by weighing this pull in the proper units and correcting for the weight of the platform, the supports and specimen, the load on the specimen is measured. The scale can be of any suitable form such as a standard weight beam or spring dynamometer, but I prefer to use an "Emery" type weight beam and poise weights such as described in Patent No. 918,488 issued to me under date of April 13, 1909.

The threaded portions of the columns 7 carry two cross heads 22 which are positioned on them by the nuts 23 (see Fig. 5). These nuts have bolted to them gears 24 which are driven by the electric motor 25 through the gearing $25^a$ as indicated in the drawings. The weight of the cross beams 22 and the parts fastened thereto is transmitted to the nuts through ring 26 and the ball bearing 27. When the vertical load exerted by the testing machine upon a specimen being tested exceeds the weight of the parts carried on the nuts 23, the load is removed from the ball bearings 27 and is exerted in the opposite direction against the nuts 23 through the polished plate bearing 28 (Fig. 5), but it is not intended that the upper part of the machine shall be moved up and down on the columns while load is applied to the specimen. Fastened to and carried by the cross heads 22 are two longitudinal beams 29, shown in Figs. 1, 2 and 3 in the form of structural I-beams secured together by bolts $29^a$. To these two beams 29 are fastened a plurality of press cylinders 31 (six being shown for illustration), the distribution and arrangement of which, in the two illustrative machines, may be seen from Figs. 1, 2 and 4, while their construction and mode of mounting upon the beams may be best seen in Fig. 3. These presses can be any suitable type of hydraulic press which will give a vertical load on the plungers $30^a$, the cylinders being fastened to the beams, but I prefer to use them as shown, with a piston 30, plunger $30^a$, cylinder 31 and cylinder head 32, and with the cylinder 31 screwed into a flange plate 33 which transmits the load from the cylinder to the beams. Square plates $33^a$ secure the top of the presses to the beams 29. The piston 30 is provided with a packing and the space above said piston is connected with any suitable source of power, preferably hydraulic, while the annular space below it may either be open to the air or may be connected to a constant hydraulic pressure which will always act to carry the weight of the piston 30 and the parts attached thereto and to close the press when the hydraulic pressure above the piston is removed. 31ª is a brass lining to give a fine surface for the packing of 30. In the design as shown, this annular space between 30ª and 31ª forms a chamber in which the air is compressed as the press opens and gradually escapes through leakage past the packing 33ᵇ. The weight of the plunger, etc., may be carried by liquid pressure in this chamber, but is here carried on helical compression springs 34 (Fig. 2) placed in sets between the beams 29, and acting through the rods 35, and brackets 36 which are bolted to the head 37.

These hydraulic presses can be used in a variety of ways as suggested in the general description, but as shown in Fig. 1, four of them are working through the pins 38 and blocks 39 upon the load beam 40, which beam carries two loading blocks 41 which can be moved toward or from each other by the right and left hand screw 42, and these blocks, through suitable plates and rollers, transmit the load of the presses to the specimen under test.

In Fig. 1, the specimen supports, which rest on the main platform, are shown at their maximum distance apart and the specimen under test is being loaded through the load beam, with its loading blocks at their maximum distance apart, giving what is known as quarter point loading. Two of the six presses here shown are not used with the load beam, as four presses are capable of exerting the maximum load for which this machine is designed. The two end presses are used when distributed loading is desired on full length specimens, in which case all the presses act directly upon the specimen without the intervention of the load beam. The upper cross heads, beam and presses are shown in an intermediate position and can be moved either up or down as required, depending upon the depth of the specimen being tested and upon the amount of apparatus placed between the presses and the specimen to receive and distribute the load.

The larger testing machine, portions of which are shown in Figs. 4 and 6, though similar in principle and general design, differs somewhat in detail, particularly in the following points. Instead of having the beams 2 which form the longitudinal members of the bed, carried upon the foundation beams 1 by leveling screws, they are bolted rigidly to the central set of beams 1 and are gibbed with suitable castings to the outer sets of foundation beams 1 to allow for expansion and contraction by change of temperature. The scale case 21ª is carried on an independent foundation 21ᵇ through cross beams 21ᶜ, instead of on the beams 2 as is done in the smaller machine. The loads for which this machine is designed are so large that the main platform will change its shape as the load is put thereon, and in order to overcome undue distortion of the fulcrums 18, or the fulcrums 18ª, between the levers 17 and the cross beams 3, load beams 43 are introduced, as clearly seen in Figs. 11 and 12. These figures also show the form of the fulcrums 18, 18ª of both machines, and their method of attachment. In the machine of Figs. 4 and 6, the load from the platform 9 is transmitted through rollers 44 to an intermediate load platform consisting of the two load beams 43 which are rigidly connected by members 45 so that when the upper portion of the platform beams 9 changes length during a test, a movement is allowed between members 9 and 43 without putting undue cross strain upon the fulcrums 18 and 18ª. In this design, large castings in the general form of I-beams with ribbed webs and flanges are substituted for the rectangular plates shown in Figs. 1 and 2.

In the small machine shown in Figs. 1, 2 and 3, the platform beams 9 are connected by beams 10, 11 and 11ª, but in the larger machine shown, the arrangement is quite different. In this machine, the cross beams 10 are replaced by the beams 43 which extend through openings in 9, secured against tipping as the platform beams 9 bend, by being relieved of direct connection with these beams 9, and by being rigidly connected to each other by the two channel members 45 which tend to keep the fulcrums 18 in a vertical position at a constant distance from each other and prevent the bending of the platform beams 9 from changing the distance between the beams 43. Rollers 44 support the main platform on the secondary platform. This secondary platform is made up of pieces 43 and 45 and their connecting bolts, brackets 45ª and bolts 45ᵇ (see Figs. 11 and 12). In this large machine, the parts 9 and 9ª are directly connected by 11 and 11ª and such additional parts, if any, as shall be found desirable. One of the pieces 11 goes through a clearance hole in the second lever 19. In this large machine, these platform beams 9 and 9ª are too large to be manufactured in a single piece for the full length of the platform and are, therefore, made in halves and two of them on each side fastened together on the center line of the machine. This joint has to carry a very large strain and while it might be made in any suitable form such as cover and side plates bolted or riveted to the two beams, I prefer to make it in the form shown generally in Fig. 6, but shown in greater detail in Figs. 7, 8, 9 and 10, where 9 and 9ª are the ends of the two halves of the platform beams which are first bolted together by the reamed bolts 9ᵇ, after which top and bottom cover plates 46 and 47 and the four side cover plates 48 are put in place and bolted loosely and then double wedges 49 and 50 are driven to place, between overlapping shoulders of the cover plates and beam members, after which the cover plates are bolted down tightly. The specimen 14 shown under test in this machine is a riveted box girder as shown in Figs. 4, 4ª and 6.

The construction of the upper portion of the machine of Figs. 4 and 6 is similar to that shown in Figs. 1 and 2, except that the upper beams 29 are preferably ribbed castings instead of I-beams and are extended at either end by pieces such as the piece 29ª, where foundry and machine shop facilities do not permit of the use of a single long casting on each side.

In Figs. 1 and 2, which show the small machine, the weighing levers are placed between the side beams 9 of the weighing platform at such a height that their fulcrums are near the plane of the neutral axis of the beams 9, in order that lateral movement and distortion of the fulcrums, under the action of the loads which bend these beams, may not cause elongation and compression in the different parts. To still further protect the fulcrums of the levers against lateral movement and distortion in the large machine, the fulcrums of the weighing levers are not only placed as near the plane of the neutral axis of the platform beams 9 as is convenient, but there is also introduced the intermediate loading platform made of the beams 43 and their connecting parts 45, 45ª, 45ᵇ with the rollers 44 and their hardened seats 44ª (see Fig. 11).

I claim:—

1. In a transverse testing machine, a plurality of independent presses for loading the specimen, and a beam to which they are securely attached.

2. In a transverse testing machine, a plurality of independent presses for loading the specimen, and a beam to which they are securely attached at equal distances from each other.

3. In a transverse testing machine, a plurality of independent hydraulic presses for loading the specimen, a movable beam to which they are securely attached and means for supplying pressure-fluid independently to the respective presses, at will.

4. In a transverse testing machine, a plurality of similar independent presses for loading the specimen, and a movable beam to which they are securely attached.

5. In a transverse testing machine, a plurality of similar independent presses for loading the specimen, and a beam to which they are securely attached at equal distances from each other.

6. In a transverse testing machine, a movable beam carrying a plurality of independent presses in combination with a plurality of threaded columns, and nuts on said columns carrying said beam.

7. In a transverse testing machine, a beam carrying a plurality of independent presses in combination with a plurality of threaded columns, and gear driven nuts on said columns carrying said beam.

8. In a transverse testing machine; a movable beam, a plurality of similar presses fixed to and carried by said beam in combination with a plurality of threaded columns, cross heads supporting said beam, nuts on said columns through which said cross heads are supported, and ball bearings on the upper side of the nuts to carry the weight of the presses, beam, cross heads and attachments.

9. In a transverse testing machine having a plurality of loading presses; a removable load beam which receives the load from several of the presses and transmits it to the specimen at two points through two loading bearings.

10. In a transverse testing machine having a plurality of loading presses; a removable load beam which receives the load from several of the presses and transmits it to the specimen at two points through two loading bearings and a right and left hand screw to fix and hold these bearings in place at equal distances from the center.

11. In a testing machine, the combination of a pair of longitudinal beams, constituting the main frame of the scale platform, a pair of weighing levers placed between said platform beams, and a pair of cross-beams to transmit the platform load to these levers, these weighing levers being so placed that their fulcrums are nearly in a plane containing the neutral axis of the platform beams.

12. In a testing machine having a weighing platform, a pair of longitudinal beams constituting the main bed or frame of the scale platform, a pair of weighing levers placed between these beams, a pair of cross-beams supporting these levers, and a pair of cross-beams to transmit the load of the platform to the said weighing levers, these weighing levers being so placed that their fulcrums are nearly in a plane containing the neutral axis of the main beams of the platform.

13. In a vertical testing machine having a scale platform, a pair of parallel beams constituting the main bed of the scale platform, a pair of weighing levers placed between these beams, a pair of cross-beams to transmit the platform load to these levers, a pair of supports for the fixed fulcrums of these levers, and a set of horizontal stay plates 12, located near the neutral axis of the main beams of the platform which fix the levers and platform beams against relative horizontal motion but permit vertical movement.

14. The combination in a testing machine having a scale platform, of a pair of parallel beams constituting the main bed of the scale platform, a pair of weighing levers between these beams with suitable supports therefor and a secondary platform to transmit the load on the platform to the weighing levers, this secondary platform consisting of a pair of cross-beams having rigid connecting parts to keep them from tipping so they will transmit their loads vertically to the weighing levers.

15. The combination in a testing machine having a scale platform, of a pair of parallel beams constituting the main bed of the scale platform, a pair of weighing levers between these beams with suitable supports therefor and a secondary platform to transmit the load on the platform to the weighing levers, this secondary platform consisting of a pair of cross-beams having rigid connecting parts to keep them from tipping so they will transmit their loads vertically to the weighing levers, and a set of rollers placed between the main receiving platform and this secondary platform.

16. In a testing machine, a fixed bed, a movable main press supporting beam consisting of two main parallel parts suitably connected, and a plurality of presses between them rigidly connected thereto.

17. In a testing machine, a main press-supporting beam consisting of two main parallel parts, cross beams connecting said main parallel parts, and a plurality of loading presses located between said main parallel parts and supported by said cross-beams.

18. In a testing machine, a pair of longitudinal beams, a pair of weighing levers 17 between said beams, a secondary lever 19 and a connecting fulcrum plate 20, said plate transmitting the load from the levers 17 to the lever 19.

19. In a testing machine, a load receiving platform constructed of two main parallel platform beams, a pair of supports through which said beams receive the load put on the specimen being tested, and a plurality of weighing levers placed between these platform beams, suitably supported and arranged to receive the load from this platform, the two main platform beams each being constructed of two main parts spliced together.

20. In a testing machine, a load receiving platform constructed of two main parallel platform beams, a pair of supports through which said beams receive the load put on the specimen to be tested, and a plurality of weighing levers placed between these platform beams suitably supported, and arranged to receive the load from this platform, the two main platform beams each being constructed of two main parts secured together by bolts $9^b$, pieces 46, 47, 48 and wedges 49 and 50.

The foregoing specification signed at Stamford, Conn., this 27th day of April, 1914.

ALBERT HAMILTON EMERY.

In presence of two witnesses:
  A. N. PHILLIPS,
  A. H. EMERY, Jr.

Copies of this patent may be obtained for five cents each, by addressing the "Commissioner of Patents, Washington, D. C."